United States Patent [19]

Warbus et al.

[11] Patent Number: 4,774,524

[45] Date of Patent: Sep. 27, 1988

[54] ARRANGEMENT FOR DRIVING A PLURALITY OF NON-MECHANICAL PRINTER DEVICES IN TANDEM OPERATION

[75] Inventors: Volker Warbus, Deisenhofen; Manfred Wiedemer, Ismaning, both of Fed. Rep. of Germany

[73] Assignee: Siemens Aktiengesellschaft, Berlin & Munich, Fed. Rep. of Germany

[21] Appl. No.: 26,437

[22] Filed: Mar. 16, 1987

[30] Foreign Application Priority Data

Mar. 14, 1986 [DE] Fed. Rep. of Germany ....... 3608613

[51] Int. Cl.⁴ .......................... G01D 9/04; H04N 1/21
[52] U.S. Cl. ...................................... 346/44; 358/296; 364/520
[58] Field of Search .......................... 346/44; 358/296; 364/520

[56] References Cited

U.S. PATENT DOCUMENTS

| | | | |
|---|---|---|---|
| 4,311,723 | 1/1982 | Mugrauer | 427/14.1 |
| 4,383,277 | 5/1983 | Kubo | 358/296 |
| 4,579,446 | 4/1986 | Fujino et al. | 355/24 |
| 4,609,279 | 9/1986 | Hausmann et al. | 355/3 SH |
| 4,638,372 | 1/1987 | Leng | 358/296 |

FOREIGN PATENT DOCUMENTS 0154695  9/1985  European Pat. Off. .
3324996A1 1/1984  Fed. Rep. of Germany .

Primary Examiner—E. A. Goldberg
Assistant Examiner—Mark Reinhart
Attorney, Agent, or Firm—Hill, Van Santen, Steadman & Simpson

[57] ABSTRACT

A drive arrangement for driving a plurality of non-mechanical printing devices working in tandem operation includes an independently functioning control arrangement for each printing device coupled to an external data source, the control arrangement being organized in a data control level and in a device control level. Coupling of the printing devices through coordination control units ensues on the device control level for synchronization so that a web-shaped recording medium is printed first in a first device and then supplied to further, following printing devices.

11 Claims, 4 Drawing Sheets

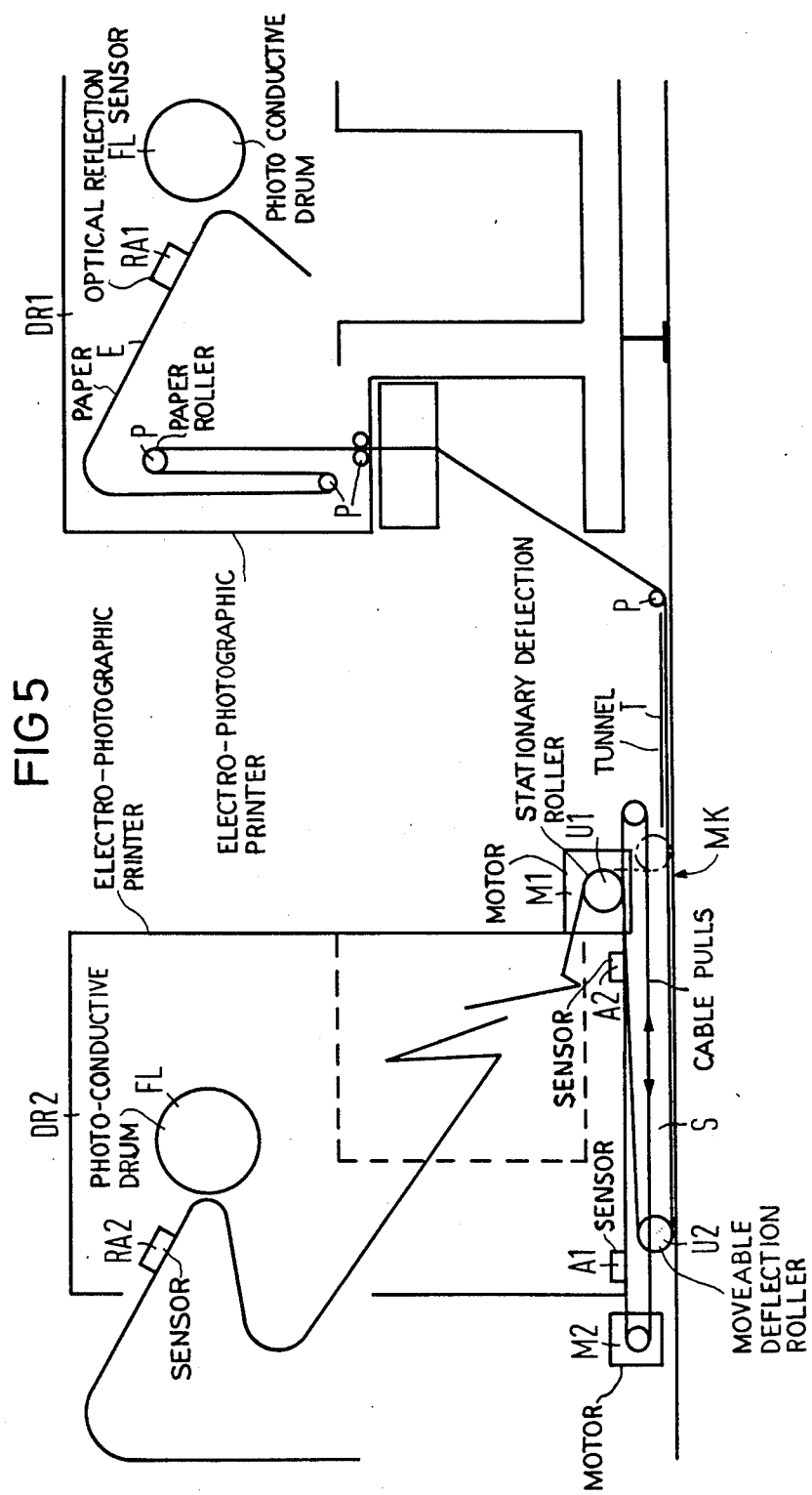

ARRANGEMENT FOR DRIVING A PLURALITY OF NON-MECHANICAL PRINTER DEVICES IN TANDEM OPERATION

BACKGROUND OF THE INVENTION

1. Field of the Invention

The present invention relates generally to a device for controlling the operation of a plurality of printers operating in tandem with a recording medium being printed first by one of the printers and then by following ones of the printers.

2. Description of the Related Art

European Patent Application No. 0,154,695 and corresponding U.S. Pat. No. 4,609,279 disclose a laser printing system for either multi-color or verso printing. The disclosed laser printing system includes a plurality of devices arranged in succession which are simultaneously operated, wherein a recording medium emerges from the paper exit region of a preceding device and is supplied to a paper entry region of a following device, which may be a printer or fixing device. Between the two devices is a switchable deflection means for the recording medium or paper web. It is, thus, possible to provide modular construction of individual fixing modules and printing modules for combination with one another to form the individual devices wherein at least one fixing module follows a plurality of printing modules.

German Pat. OS No. 33 24 996 and corresponding U.S. Pat. No. 4,579,446 discloses a printer device for electrophotographic operation that is suitable for both recto and verso printing. Two individual devices are coupled to one another with a sheet turning mechanism arranged therebetween. First, a paper sheet is printed on the recto, or front, side with the first device, after which the paper is turned by the paper turning mechanism and is printed on the verso, or back, side with the following device.

When such printers are operated in a tandem mode, a significant problem arises in providing synchronous drive.

From German Pat. OS No. 33 24 996, it is known to provide a central common control unit to drive two devices, wherein the control unit includes page memories for every individual device in which image information to be printed is stored. The corresponding allocation of the image information into the individual devices is performed by a reversing circuit.

The known central driving unit for all devices is relatively complicated in construction. Moreover, when a central drive unit is used for high speed printers, the processing speed and power of the control unit has to be extremely great due to the high data rates, the complexity of page editing, and the necessity of generating an output in real time to the printers being controlled.

A laser printer is disclosed in U.S. Pat. No. 4,311,723.

SUMMARY OF THE INVENTION

An object of the present invention is to provide an arrangement for controlling tandem operated printing devices which is of a simple construction and is easily switched between a single device operating mode and a mode in which a plurality of devices are operated. An arrangement for achieving this and other objects of the instant invention includes an independent operating control coupled to a single external data source for each of a plurality of printers. Each of the independent operating controls includes a data control level and a device control level, wherein the device control level provides coupling for synchronizing the plurality of printers.

Since each device has its own independently operating control arrangement coupled to an external data source, with the control arrangement being organized on a data control level and a device control level and the coupling of the devices for synchronization being provided on the device control level, simple switching from the coupled printing mode of operation to an individual printing mode of operation is possible. In many applications, it is extremely important that mixed mode printing be provided, in other words, a mixture of multi-color, verso (dual sided) printing, and recto (front side) printing. It is also possible, by switching to the individual printing mode, to continue the operation of one printer should a malfunction or outage occur in the printing system.

BRIEF DESCRIPTION OF THE DRAWINGS

FIG. 5 is a schematic illustration of a paper guidance system for two printers working in the tandem mode.

DESCRIPTION OF THE PREFERRED EMBODIMENTS

Figure 1:
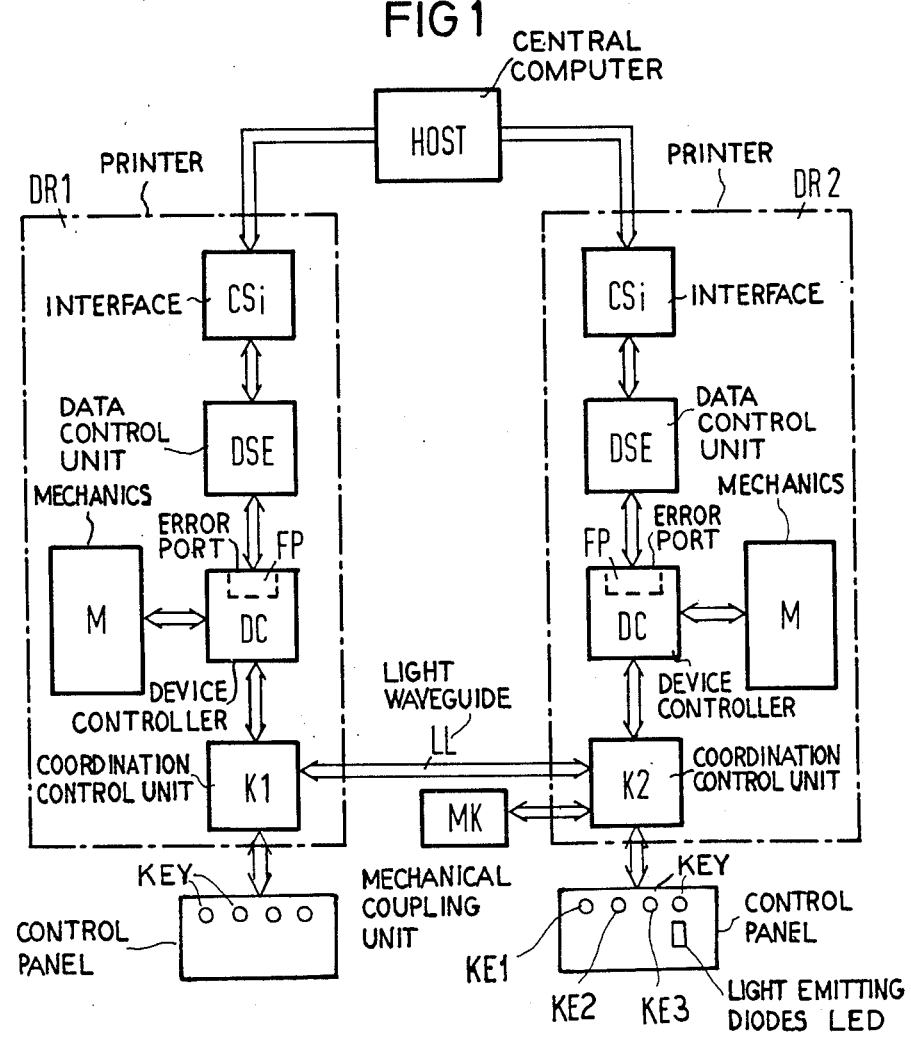
FIG. 1 is a schematic block diagram of a drive arrangement for two printing devices working in a tandem mode.
Figure 2:
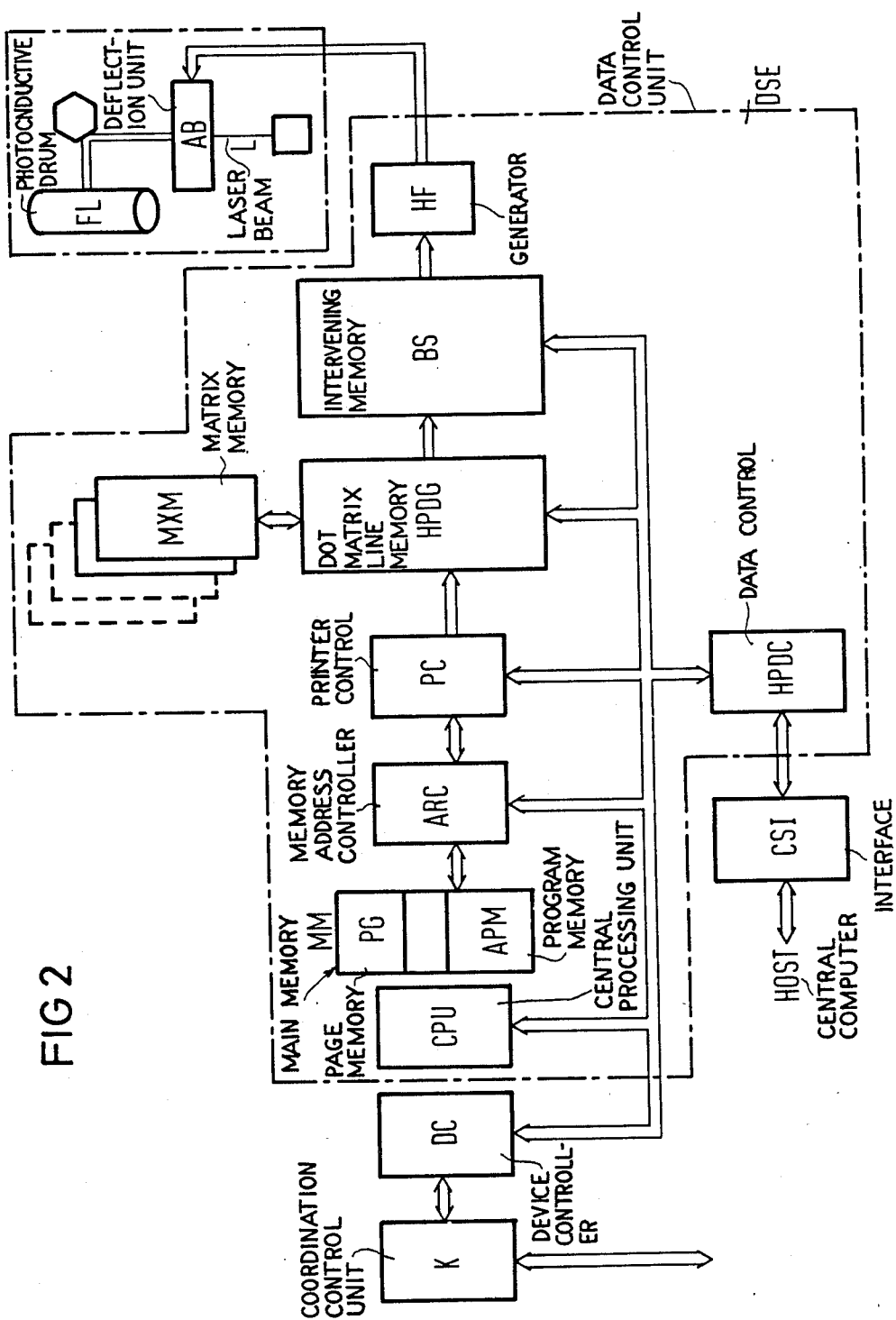
FIG. 2 is a schematic block diagram of a control arrangement for an individual printer.

With reference to both FIGS. 1 and 2, FIG. 1 showing an overview of two tandem operating printers DR1 and DR2 and FIG. 2 showing details of one of the printers, an arrangement for a printing system, such as for two electrophotographic printing devices operating in a tandem mode, is set forth herein.

The structure of the individual printers is in accordance with European Patent Application No. 0,154,695, incorporated herein by reference. Each printer includes a drive unit as shown in detail in the block diagram of FIG. 2. In particular, a laser printer is shown including an acousto-optical deflection unit AB as a component part of a printer, such as set forth in U.S. Pat. No. 4,311,723. The acousto-optical deflection unit AB splits a laser beam L into six beams, five of which generate print characters, and a sixth of which is used to generate a clock signal. The five print generating, or write, laser beams are used to generate print characters upon modulation by a generator HF located in a data control unit DSE. The generator HF is driven by a dot matrix line memory HPDG through an intervening memory BS. The dot matrix line memory HPDG stores bit-by-bit the individual dots for the image characters of a print line. Each print line is called in from a page memory PG which contains a full page of print and is located in a main memory MM. The dot matrix line memory HPDG is also in communication with a matrix memory MXM in which are stored bit-by-bit the possible representable characters.

The dot matrix line memory HPDG is driven, on one hand, by a print control unit PC and, on the other hand, by a central processing unit CPU for the printer. The central processing unit CPU has a greater share in the control of data flow of the printer than the print control unit PC. For example, the central processing unit CPU controls the text transmission on the data level, as well as controlling the individual printer units through a device controller DC on the device control level. The device controller DC controls, for example, the paper feed and the operation of a photo-conductive drum FL, among other things. The central processing unit CPU also controls management of the main memory MM, which includes not only the page memory PG, but also a program memory APM.

A central computer HOST is connected through an interface CSI to the data channel. A stream of data in the form of coded data that is supplied by the central computer HOST is forwarded to an appertaining data controller HPDC. In the data controller HPDC, the data is converted into matrix addresses by means of a code table and then is written into the page memory PG via a memory address controller ARC. The matrix addresses, which have been written into the page memory PG refer to locations in the matrix memory MXM in which the print characters are stored in bit form. During printing, the print controller PC fetches matrix addresses from the main memory MM and transmits them line-by-line to the dot matrix line memory HPDG. By accessing the matrix memory MXM, the dot matrix line memory HPDG generates the print format in a bit pattern of the individual dots to be printed.

Therefore, the control of the printer devices is divided into two levels, namely, a data control level provided in the data control, or supervision, means DSE and a device control level provided in the device controller DC.

Referring to FIG. 1, for synchronizing the printers DR1 and DR2 when working in tandem operation, coordination control units K1 and K2 are provided, one in each of the respective printers DR1 and DR2. The coordination control units K1 and K2, designated generally as K in FIG. 2, are in communication with one another through data lines which are preferably light waveguides LL. The coordination control units K1 and K2 operate to control the printers DR1 and DR2 on the device control level. The structure of the coordination control units K is set forth in greater detail with respect to FIG. 3, as will be described hereinafter.

Preferably, one of the coordination control units, in this case the unit K2, is assigned a master function. The allocation of the master function, however, is arbitrary and can alternately be allocated to the other coordination control unit K1 at any time. The coordination control unit K2 that assumes the master function is connected in communication with a mechanical coupling unit, or coupling mechanism, MK arranged between the printers DR1 and DR2. In the present embodiment, the mechanical coupling device MK is a paper tensioner.

In an overall view of FIG. 5, the two electrophotographic printers DR1 and DR2 are coupled to one another for producing recto and verso printing. In other words, together the printers DR1 and DR2 print on both front and back sides of a page. The coupling and mechanical structures of the printers are set forth in greater detail in European Pat. OS No. 01 54 695, incorporated herein by reference.

Figure 4:
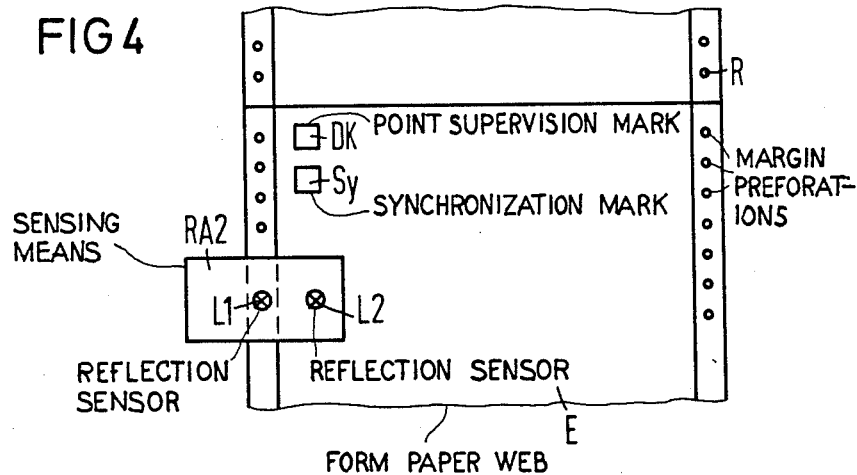
FIG. 4 is a plan view of a recording medium in the form of fanfold paper having a synchronizing mark for use in the present invention.

In FIG. 5, a prefolded continuous form paper E or other recording medium is printed with toner in a first printer DR1 by the photoconductive drum FL in a process known as electro-photography. An optical reflection sensor RA1 monitors the feeding of the continuous form paper E by sensing margin perforations R (shown in FIG. 4) along the edge of the fan-folded form paper E. The optical reflection sensor RA1 conducts signals corresponding to the sensed perforations R to the coordination control units K. The margin perforations are not required in every instance, other paper feed sensors may be provided instead. The continuous form paper E is then conducted through a cold fixing station over paper rollers P for fixing of the toner. The continuous form paper E which has been fixed in this way is transmitted to the second printer DR2 for printing on the verso, or back side, or for multi-color printing. Additional printers (not shown) may also be required for multi-color printing.

For the purpose of paper length compensation and to facilitate insertion of the web-shaped form paper E, the mechanical coupling unit MK comprises a paper length compensating means which functions as a loop tensioner disposed in a tunnel region T connecting the printers DR1 and DR2. The paper length compensating means MK is disposed below the actual frame of the printer unit DR2, although the paper length compensating means MK can also be arranged at a paper exit region of the first printer DR1. The length compensating means MK is composed of a stationarily mounted deflection roller U1 which is driven by a motor M1 and is further composed of a second deflection roller U2 that is longitudinally displaceable between an idle position and a paper insertion position. A motor M2 and cable pulls S provide the means for displacing the second deflection roller U2. First and second sensor elements A1 and A2, which are preferably switches, are mounted in the displacement region of the second deflection roller U2. The sensor elements A1 and A2 sense the position of the deflection roller U2 and transmit the resulting signals to the coordination control unit K2 in the printer DR2.

To generate a constant paper tension along the paper web E, the motor M2 is always maintained in a nonpositive lock with the roller U2 during tandem printer operation with a looped paper web and, thus, constantly exerts retensing force on the paper web E.

For inserting the paper E, the second deflection roller U2 is moved from the back position as shown in solid outline in FIG. 5, to a paper threading, or insertion, position as shown in broken outline in FIG. 5. Although the work rhythm and the timing of the printers DR1 and DR2 generally allow a pagesynchronous operation which would provide a constant paper length between the printers DR1 and DR2, it is unavoidable that the printers will be started and stopped, which cannot be completely synchronized. Thus, the unavoidable starting and stopping events are compensated by the paper length compensating device MK.

To keep the speed of the deflection roller U2 below an upper limit as the deflection roller U2 is moved to the back detent region, the motor M2 is operated in a pulsed fashion during movement of the roller U2 toward the back, or idle, position. Thus, the roller U2 strikes the back detent position with a defined, limited kinetic energy.

A sensing means RA2, which corresponds functionally to the sensing means RA1 in the printer DR1, is provided for the printer DR2. The sensing means RA2 is shown in more detail in FIG. 4, and includes a reflection sensor L1 which senses the margin perforations R along the continuous form paper E, and further contains a reflection sensor L2 which senses synchronization marks SY on the continuous paper E. As with the sensor RA1, the sensor RA2 need not be a sensor for margin perforations.

As already set forth, the two printers DR1 and DR2 are coupled to one another by the coordination control units K1 and K2 operating on the device control level to synchronize the control of the printers DR1 and DR2. Problems arising during control of coupled devices can be classified into the following areas:

(a) synchronization of the laser printers during starting and stopping;
(b) insertion of the paper web E into the laser printing system in such a way as to guarantee unity of the print data transferred onto the paper sheets by all of the printers;
(c) monitoring the unity of the print data transferred onto sheets by all of the laser printers;
(d) influencing the operating functions of the individual laser printers, and creating new operating functions related to the coupling of the laser printers, such as, in particular, providing simple switching from synchronized operation to unrestricted individual operation of the laser printers;
(e) controlling and monitoring the loop tensioner MK to compensate for variations in the length of the paper web extending between the coupled laser printers; and
(f) handling in the overall system any operating and hardware errors occurring in the individual laser printers, as well as monitoring and handling any errors which occur due to the coupling of the laser printers.

Problem Solution (a)

To simultaneously print a paper web E in a plurality of laser printers, it is necessary that the printers function synchronously. Thus, one printer can only be allowed to print when the other laser printer or printers are simultaneously printing. When a printer stops for any reason whatsoever, such as for interruptions in operating for deficient data, as well as for operations performed by an operator, then the other printers must also be immediately stopped. The printers can only be restarted when there is no error indication at any printer and when all printers have received data from the central computer HOST adequate for a complete page.

Since the present laser printer system is formed of two (DR1 and DR2) or more individual printers which are only coupled on the device control level, the internal synchronization for each printer between the device controller DC and the data supervision means DSE is not effected, such as, for example, phasing in of the opto-mechanical diapositives. For this reason, it is not possible to exactly synchronize the starting and stopping of all the printers.

Any chronological shift of the starting and/or stopping events has a direct effect on the length of the paper web E extending between the printers. The use of cold fixing causes a further need for keeping the paper web length variable. The use of a fixer makes it necessary that, in the stopped condition, the printed paper web E must be moved out of the lower region of the fixing station in which the highest concentration of fixing agents prevails. As shown in FIG. 5 for the printer DR1, such removal of the paper web E causes a lengthening of the paper web between the printers DR1 and DR2.

Any differences in the length of the paper web E between the printers DR1 and DR2 are intercepted in the loop tensioner MK which is of sufficient size to absorb any displacement due to fixing, displacements due to starting and stopping events, and geometrically resulting differences in the length of the paper web E during recto and verso printing.

The coordination control unit K2 insures that the capacity of the loop tensioner MK is adequate. In other words, the coordination control unit K2 prevents further differences in paper length over the maximum acceptable by the loop tensioner MK from being added. Except in the case of a malfunction, the starting of a laser printer occurs only in page fashion. Thus, the resulting shifts from internal printer synchronization amounts to at most one page. Therefore, when the paper loop in the tensioner MK is one page too small after a stop, the coordination control unit MK sees to it that the paper loop does not become even smaller at the next stop. This is done by guaranteeing that the second printer DR2 does not begin to print until the first printer DR1 has begun printing and feeding paper. An analogous control for the opposite case is provided when the paper loop is too big.

Figure 3:
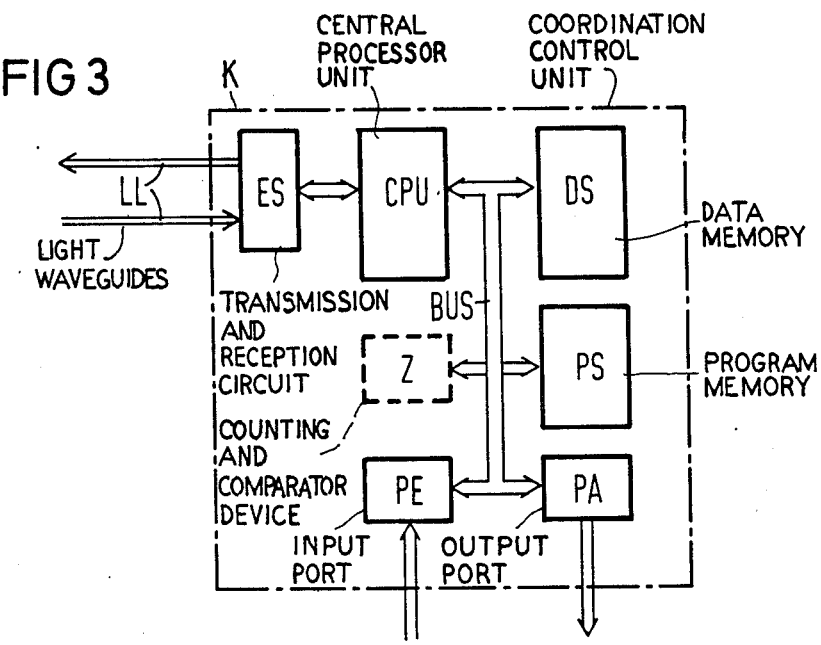
FIG. 3 is a schematic block diagram of a coordination control unit in one of the printers.

To this end, both printers DR1 and DR2 include the sensing devices RA1 and RA2 which generate pulses dependent on the paper feed. The coordination control units K1 and K2 count the page feed pulses. In FIG. 3, one of the coordination control units K1 and K2 (indicated generally as K) includes a counting and comparator device Z shown in dotted outline. Upon the printers DR1 and R2 being stopped, the counter readings of the counters Z of the respective coordination control units K1 and K2 are compared to one another so that it can be unambiguously determined which printer is leading and which is lagging. On the basis of this information, the master coordination control unit K2 determines the sequence in which the printers DR1 and DR2 are to start. For example, when the counter reading in the second printer DR2 is higher than that in the first printer DR1, the paper loop is too small and so the second printer DR2 is not started until the first printer DR1 has begun to print.

Problem Solution (b)

Synchronous printing of a paper web E not only presumes that the coupled laser printers DR1 and DR2 are operated synchronously, but also it must be guaranteed that all printers print data that belongs together onto one sheet. In combination with the data supervision means DSE, the software of the central computer HOST sees to it that data is output to the laser printers in the proper sequence. In combination with the device controllers DC, the coordination control units K1 and K2 see to it that the paper web is inserted into the printing system in a simple way such that all printers begin printing on the same sheet. This is guaranteed with the aid of the starting synchronization mark SY. After insertion of the paper web E into the first printer DR1, the starting synchronization mark SY is printed by the first printer DR1 outside a data receiving region of the continuous form paper E. The synchronization mark SY is preferably printed below a print supervision mark DK. By counting the pulses generated during the paper feed, the first printer DR1 prints enough forms, or pages, that the prescribed length of the paper web E between the printers DR1 and DR2 is exactly reached.

Upon insertion of the paper web E into the second or any subsequent printers, the sensing means RA2 seeks out the synchronization mark SY printed by the first printer DR1 while an operator advances the continuous form paper E by initiating the paper feed. As soon as the mark SY is reached, the paper feed automatically stops and the coordination control unit K2 switches to the synchronous operating mode. It is thereby assured that the paper sheet on which the preceding printer has printed the first data resides exactly under a transfer station (shown in FIG. 5 as a photoconductive drum FL) and that the paper loop has an exactly defined length.

Problem Solution (c)

Since the master coordination control unit K2 is switched to the synchronous mode, the allocation of the data to one another can no longer be lost. The allocation of data is monitored as follows: from the coordination control units K1 and K2, every nth data page has a permanent synchronization mark SY applied to it. Each synchronization mark SY is fundamentally identical to the starting synchronization mark SY and is likewise printed outside the data receiving region of the continuous form paper E at the same location as the starting synchronization mark SY. After printer start-up and after initialization of this synchronization period, a "permanent" synchronization mark SY is produced on every nth data page by each printer. The mark SY printed by the first printer DR1 is read within the second printer DR2 and the coordination control units K1 and K2 monitor whether the mark SY that the second printer DR2 prints is placed at the same location as that of the first printer DR1. During recto and verso printing, or dual sided printing, the permanent synchronization mark SY is arranged on the verso of the nth data page upon entry into the following printer DR2. If a discrepancy exists between the expected region of the permanent synchronization mark SY and the actual location of the permanent synchronization mark SY, a malfunction alarm is output. By visually comparing the printed marks SY on the recto and verso, or by comparing the marks on the recto during multi-color printing, the operator also can recognize whether a deviation exists from the prescribed allocation of data and can recognize the extent of the deviation.

Problem Solution (d)

Considerable differences exist between operating a printing system composed of a plurality of laser printers successively connected as compared to operating a single printer. For instance, the possibility of misoperation is significantly greater. The coordination control units K1 and K2 assist the operating personnel in executing the operating functions which are required as a result of the successively connected printers, such as synchronizing the laser printers, inserting the paper web, switching from synchronous mode to individual mode, switching from verso printing to color printing, and by eliminating sources of possible error or indicating errors that have been made or eliminating errors after their occurrence.

Switching from synchronous operating mode to individual operating mode of the laser printers DR1 and DR2 is realized in the simplest possible way. By actuating a key KE1 the printers DR1 and DR2 are decoupled and the laser printers can be used as individual printers without restriction. When the operating mode is not switched to the individual printing mode, the laser printers DR1 and DR2 are coupled to one another through a light guide LL, as shown in FIG. 1.

Different starting operations are required to synchronize the printers DR1 and DR2, such as when a paper web E is already in the printing system compared to when a new paper is to be inserted. Synchronization of the printers can be initiated by the operating personnel by actuating a synchronization key. The coordination control units KR1 and KR2 automatically recognize whether a paper web E is inserted, as determined by driving the deflection roller U2 situated in the loop tensioner MK. When the deflection roller U2 reaches the switch A1 at the back detent, then no paper is present and the coordination control unit K2 assists in the insertion of a paper web E and in the synchronization of the printers DR1 and DR2 as set forth in problem solution (b).

When the dislocation of the deflection roller U2 does not reach the switch A1, then the paper web E is already inserted and the control unit automatically assumes that the printers DR1 and DR2 are synchronized. The operating personnel need only see to it that the paper web E is inserted fold-suited and that the printers are placed in their ready position. The coordination control units K1 and K2 insure that a start synchronization mark SY is printed in the first printer DR1, similar to that set forth under problem solution (b). Subsequently, the first printer DR1 prints the data that has been output by the central computer HOST, which is exactly enough forms for the prescribed length of paper web E to extend between the printers DR1 and DR2, as determined by counting paper feed pulses.

While the first printer DR1 is printing data, the coordination control unit K2 sees to it that the second printer DR2 is feeding empty pages. In this way, the loop length of the paper web E remains constant and a constant tension is exerted on the paper web E by driving the movable deflection roller U2 horizontally. This guarantees faultless paper running.

While the second printer DR2 is feeding empty pages, the sensor unit RA2 mounted therein seeks the synchronization mark SY printed by the first printer DR1. The paper feed is stopped as soon as the start synchronization mark SY is found; then the coordination control units K1 and K2 are switched to a synchronous mode. It is now guaranteed that the second printer DR2 begins the data print out on the same sheet on which the first printer DR1 also began printing.

Since an asynchronous paper feed would lead to the loss of the proper matching of data to a given sheet when in a synchronous mode, the control computer HOST insures that any errors made by the operating personnel in setting the paper feed rate have no effect. In the synchronized mode, control panel for adjusting the paper feed rate of the individual printers are disabled. When the paper web E is inserted, a check is made by the central computer HOST to insure that the same form length is set at all printers and any inconsistencies are detected.

Furthermore, the control computer HOST is designed so that operating personnel can advance the paper web E without printing being carried out, for example, when there is to be a change in paper type at the end of a printed stack. When this common advance, or common eject, function is used, then the synchronization of the printers DR1 and DR2 is cancelled with respect to the data being printed. In other words, the proper allocation of the print data for the first and the nth printer is lost. In this case, as well as in other conditions where data losses occur, such as for hard errors or voltage outages, the coordination control units K1 and K2 provide a continuation of the printing only when synchronization is renewed or, alternately, when the printers are in the individual mode. Renewal of the synchronization mode is accomplished by fold-suited adjustment of the paper web and actuation of the synchronization key KE2, while switching to the individual mode can be engaged at any time by actuating an interrupt key KE3.

The coordination control units K1 and K2 enable an extremely simple change between the printing mode from verso to recto printing and vice versa. As disclosed in European Patent Application OS No. 01 54 695, deflection of the paper web E is accomplished by a round rod which is attached in different positions for verso printing and recto printing. The control computer HOST recognizes the position of the round rod by means of a switch (not shown) and reacts accordingly. The print mode in which the printers are operating is indicated at a control panel by two light emitting diodes LED. Depending upon the mode selected, the sensor means RA2 fo sensing the synchronizing marks SY is switched on or off in the second printer DR2, and mutually different paper lengths between the printers may be determined upon paper insertion.

Problem Solution (e)

The coordination control units K1 and K2 provide control and monitoring of the described loop tensioner MK for paper length compensation. The first stationarily mounted deflection roller U1 is driven by the motor M1 during insertion of the paper web E and, when the paper is in motion, no additional friction is generated. The second longitudinally displaceable deflection roller U2 is moved in the horizontal direction by the motor M2 and by cable pulls S. A constant paper tension must be generated while the paper web E is being synchronously moved by both printers DR1 and DR2, and must also be generated during the standstill times in the synchronous mode. To achieve this, the motor M2 which moves the deflection roller U2 is charged with a constant voltage.

To thread the paper web E into the paper tunnel T, the deflection roller U2 is moved into the insertion position, as shown in broken lines in FIG. 5. Such movement is done in pulsed fashion so as to limit the kinetic energy of the deflection roller U2. The roller U2 is likewise driven in pulsed fashion during initial tensioning of the paper web E for the same reason. To insure that thick paper is sufficiently taut, the coordination control unit K2 provides that the tension force on the roller U2 can be increase by switching the motor M2 to a higher operating voltage during the pulsed mode. Similarly, a lower tension force may be set for thinner paper.

The mechanical coupling mechanism, or loop tensioner, MK which provides paper length compensation includes the two sensor devices A1 and A2 which can be used for different purposes. With the back sensor switch A1, first, a check is carried out as set forth under problem solution (d) to determine whether the paper web E is inserted into the printer system. Secondly, during synchronous printing, a tearing of the paper web E is recognized by actuation of the switch A1. When the front sensor A2 is actuated by the deflection roller U2, the paper web E has become unallowably short due to a device error, or possibly due to an operating error, and there is a risk that the continuous form paper E will rip. In this case, the coordination control units K1 and K2 stop the second printer DR2 and let the first printer DR1 feed enough paper E so that the deflection roller U2 again lies in an intermediate position.

Problem Solution (f)

The handling of device and operating errors plays a significant role in a printing system having two or more coupled laser printers since, at all times, loss of data must be prevented and, above all else, the allocation of corresponding printed data to one another must not be lost. Thus, it is guaranteed that, for a device error which leads to an immediate standstill of the system, the data stored in the page memory PG, shown in FIG. 2, of a printer is erased and the stack to be printed is set back to such a degree that the printing operation can be continued immediately following the last page that was correctly printed. This makes it necessary that the pages that have been printed by the first printer DR1 are reprinted.

Since the coupling mechanism, or loop tensioner, MK has a limited capacity, one printer must be immediately stopped when the other printer is stopped. The coordination control units K1 and K2 guarantees synchronous stopping; data that is stored in the page memories PG is then erased in all of the coupled printers DR1 and DR2. A corresponding error is indicated at the control panel of the printers, which in this case is the printer DR2, and is also reported to the central computer HOST. Further printing is only possible by resynchronization of the printers DR1 and DR2 as set forth in problem solution (d). As a result of the synchronization routine which is preferably compulsory upon interruption of the printers, the unity of the print data on a sheet is guaranteed.

A further source of possible errors when operating coupled printing devices DR1 and DR2 occurs when the paper web E is not aligned fold-suited before synchronization of the laser printers. In other words, the fan-folded paper web E lies longitudinally offset in the printer. This condition is recognized by the coordination control units K1 and K2 since the synchronization mark SY printed by the first printer DR1 is not in its anticipated location which, for example, is at the eighth or eleventh line following a fold. In such case, an alarm is output.

The form length selection is set at the control panel of the printers DR1 and DR2 and is checked during paper insertion; only given coincidence are the functions necessary for insertion enabled. If the form lengths are unequal, an alarm is output at the control panel and a potential operating error is avoided thereby.

The coordination control units K1 and K2 allocated to the individual printer devices DR1 and DR2, respectively, are identical in structure in accordance with FIG. 3. The control units, denoted generally at K, contain a central processing unit CPU which, for example, can be composed of a microprocessor system 8031. The microprocessor system CPU is in communication with a data memory DS and with a program memory PS through a bus line BUS. The counting and comparator means Z is likewise allocated to the central processor unit CPU, being shown in broken lines since the counting and comparison events are generally executed within the central processor unit CPU. The central processor unit CPU is in communication with the device controller DC through input and output ports PE and PA. The data exchange between the coupled coordination control units K1 and K2 is through the light conductors LL with appertaining reception and transmission circuits ES which may contain, for example, a light emitting diode as a transmission element and a phototransistor as a reception element.

The allocation of the master function to the coordination control units K1 or K2 ensues by means of a corresponding program. In principle, each of the coordination control units K1 and K2 is suitable for assuming the master function.

The collaboration of the coordination control units K1 and K2 shall be set forth in greater detail with reference to a typical error: when a hard error, i.e. a paper tear of the paper web E before entry into the mechanical coupling MK, occurs in, for example, the printer DR1, the sensor RA identifies the paper tear. The paper feed is immediately stopped by the device controller DC allocated to the printer DR1. The coordination control unit K1 coupled to the device controller DC of the printer DR1 recognizes the print interruption and the appertaining error and reports this to the coordination control unit K2 through the light waveguide LL. The device controllers DC in the printers DR1 and DR2 include error ports FP which, for example, are composed of symbolic memory areas. In the case of an error, an error is written into the error port FP of the printer DR1 by the device controllers DC and is read out by the data control units DSE. The data control units DSE display this error on the control panel of the printers DR1 and DR2. Furthermore, they report the error to the central processor units CPU. The central processor units themselves then initiate erasing of the page memories PG, shown in FIG. 2.

After reporting an interruption in operations from the coordination control unit K1 to the coordination control unit K2, the coordination control unit K2 initiates a stop of the feed in the printer DR2 through the device controller DC, so that the paper feed in the printer DR2 and the printer DR1 is nearly simultaneously interrupted. At the same time, the coordination control unit K2 sets an error in the error port FP of the device controller DC of the printer DR2. As a result of this error simulation in the printer DR2, the error is reported to the central processor unit CPU of the printer DR2 through the data controller DSE of the printer DR2 when the error port FP in the printer DR2 is read out. The central processor unit CPU of the printer DR2 then erases the page memory PG of the printer DR2.

All page memories PG are, thus, erased and it is possible to place the printers back into operation after elimination of the error by calling in the described synchronization routine for initialization of the printers.

Although other modifications and changes ma be suggested by those skilled in the art, it is the intention of the inventors to embody within the patent warranted hereon all changes and modifications as reasonably and properly come within the scope of their contribution to the art.

We claim as our invention:

1. A device for driving a plurality of printers for operation in tandem wherein a web-shaped recording medium is first printed by a first of said plurality of printers and then is selectively supplied to at least one subsequent printer, comprising:
   an independently operating control arrangement for each of said plurality of printers;
   an external data source coupled to each of said control arrangements; and
   said control arrangement each having a data control level and means for synchronization including a device control level coupling said plurality of printers;
   a coordination control unit allocated to each of said printers;
   data lines connecting said coordination control units to one another to provide communication therebetween; and
   an arbitrary one of said coordination control units being a master coordination control unit.

2. A device as claimed in claim 1, wherein said plurality of printers are each non-mechanical printers.

3. A device as claimed in claim 2, wherein said non-mechanical printers are electro-photographic printers.

4. A device as claimed in claim 1, wherein said coordination control units provide a compulsory synchronization routine for initializing said printers after each event interrupting the synchronization of said printers.

5. A device as claimed in claim 1, wherein said data lines are light conductors.

6. A device for driving a plurality of printers for operation in tandem wherein a web-shaped recording medium is first printed by a first of said plurality of printers and then is selectively supplied to at least one subsequent printer, comprising:
   an independently operating control arrangement for each of said plurality of printers;
   an external data source coupled to each of said control arrangements;
   said control arrangements each having a data control level and means for synchronization, said means for synchronization including a device control level coupling said plurality of printers;
   a coordination control unit allocated to each of said printers;
   data lines connecting said coordination control units to one another to provide communication therebetween;
   an arbitrary one of said coordination control units being a master coordination control unit;
   means for paper length compensation being a loop tensioner for said recording medium when the recording medium extends between said printers when operating in tandem;
   a sensor mounted in at least one of said printers for sensing feeding of the recording medium and thereby generating signals;
   means for counting pulses in said at least one printer; and
   said coordination control units controlling paper length capacity by acquiring signals from said sensors in said printers dependent on the feed of the recording medium and supplying pulses to said counting means, said coordination control units comparing readings of said counting means upon interruption in the operation of said printers and determine a sequence of initialization for restarting said printers depending upon the compared readings.

7. A device for driving a plurality of printers for operation in tandem wherein a web-shaped recording medium is first printed by a first of said plurality of printers and then is selectively supplied to at least one subsequent printer, comprising:
- an independently operating control arrangement for each of said plurality of printers;
- an external data source coupled to each of said control arrangements;
- said control arrangements each having a data control level and means for synchronization, said means for synchronization including a device control level coupling said plurality of printers;
- a coordination control unit allocated to each of said printers;
- data lines connecting said coordination control units to one another to provide communication therebetween;
- an arbitrary one of said coordination control units being a master coordination control unit;
- a first of said printers in a recording medium running direction generating a start mark on the web-shaped recording medium, and
- a sensor means allocated to following ones of said printers for sensing the start mark to synchronize an initialization of said printers by said coordination units.

8. A device for driving a plurality of printers for operation in tandem wherein a web-shaped recording medium is first printed by a first of said plurality of printers and then is selectively supplied to at least one subsequent printer, comprising:
- an independently operating control arrangement for each of said plurality of printers;
- an external data source coupled to each of said control arrangements;
- said control arrangements each having a data control level and means for synchronization, said means for synchronization including a device control level coupling said plurality of printers;
- a coordination control unit allocated to each of said printers;
- data lines connecting said coordination control units to one another to provide communication therebetween;
- an arbitrary one of said coordination control units being a master coordination control unit;
- said printers printing a permanent sychronization mark outside an actual data region on every nth data page of the web-shaped recording medium for synchronization of said printers during operation,
- sensing means allocated to said printers for sensing the permanent synchronization mark; and
- said coordination control units identifying deviations in printer operation depending on said sensing means sensing the synchronization mark.

9. A device as claimed in claim 8, wherein said sensing means also senses a start mark to synchronize initialization of said printers.

10. A device as claimed in claim 1, further comprising:
- means for paper length compensation allocated to at least one of said printers and including:
  - a first stationary deflection element,
  - a second deflection element displaceable between an idle position and a paper insertion position,
  - a motor drive connected to selectively displace said second deflection element, and
  - drive means for driving said first deflection element at least during insertion of the recording medium.

11. A device as claimed in claim 10, wherein said motor drive for said second deflection element is driven in pulsed fashion during displacement of said second deflection element.

* * * * *